United States Patent [19]

Benjamin

[11] Patent Number: 4,458,673
[45] Date of Patent: Jul. 10, 1984

[54] SOLAR AIR HEATER

[76] Inventor: Gary L. Benjamin, Rt. #1, Box 8822, Mount Blanchard, Ohio 45867

[21] Appl. No.: 426,285

[22] Filed: Sep. 29, 1982

[51] Int. Cl.³ .............................................. F24J 3/02
[52] U.S. Cl. .................................. 126/443; 126/426; 126/442
[58] Field of Search ........................ 126/426, 428–431, 126/432, 443, 444, 442, 449, 450, 417; 34/93

[56] References Cited

U.S. PATENT DOCUMENTS

| | | | |
|---|---|---|---|
| 3,125,091 | 3/1964 | Sleeper, Jr. | 126/426 |
| 3,908,631 | 9/1975 | Rom | 126/426 |
| 4,051,834 | 10/1977 | Fletcher | 126/426 |
| 4,126,121 | 11/1978 | Fairbanks | 126/443 |
| 4,203,420 | 5/1980 | Schoenfelder | 126/426 |

FOREIGN PATENT DOCUMENTS 4580 10/1979 European Pat. Off. ............ 126/442

Primary Examiner—James C. Yeung
Attorney, Agent, or Firm—Fraser, Barker, Purdue & Clemens

[57] ABSTRACT

A solar air heater comprises a plurality of elongate concentric flexible cylinders which define an outer annular insulating region, an inner cylindrical flow region and a positioning structure therefore. A plastic panel of indeterminate length may be folded upon itself and sealed to form the outer wall of the insulating annulus, the positioning structure and a middle wall. The cylindrical flow region is defined by a self-supporting tube which is inserted into the positioning structure and middle wall. Air flowing through the self-supporting tube is heated by available solar energy and the outer region, inflated by air at a pressure slightly above atmospheric pressure, acts as an insulator.

16 Claims, 8 Drawing Figures

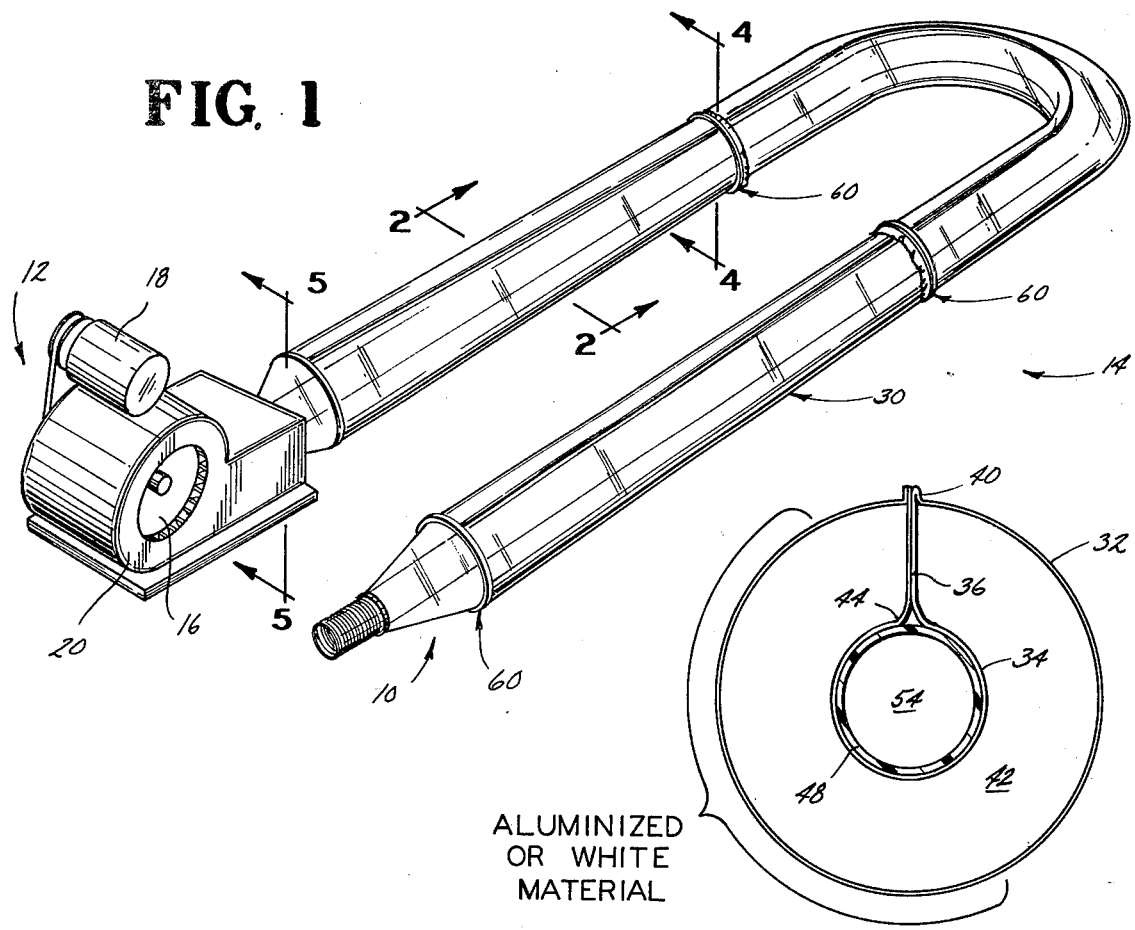
FIG. 1
FIG. 2
ALUMINIZED OR WHITE MATERIAL
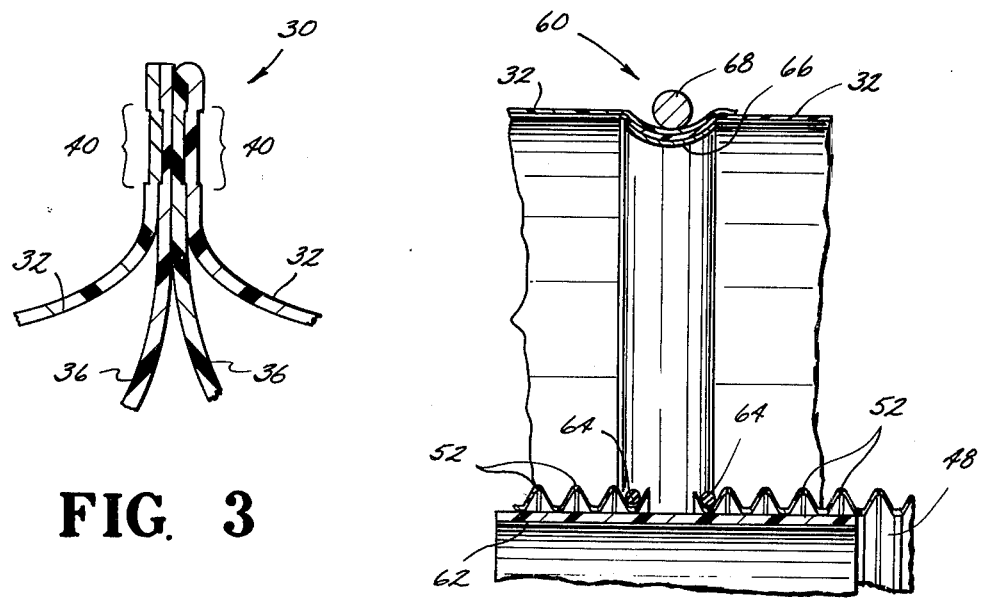
FIG. 3
FIG. 4

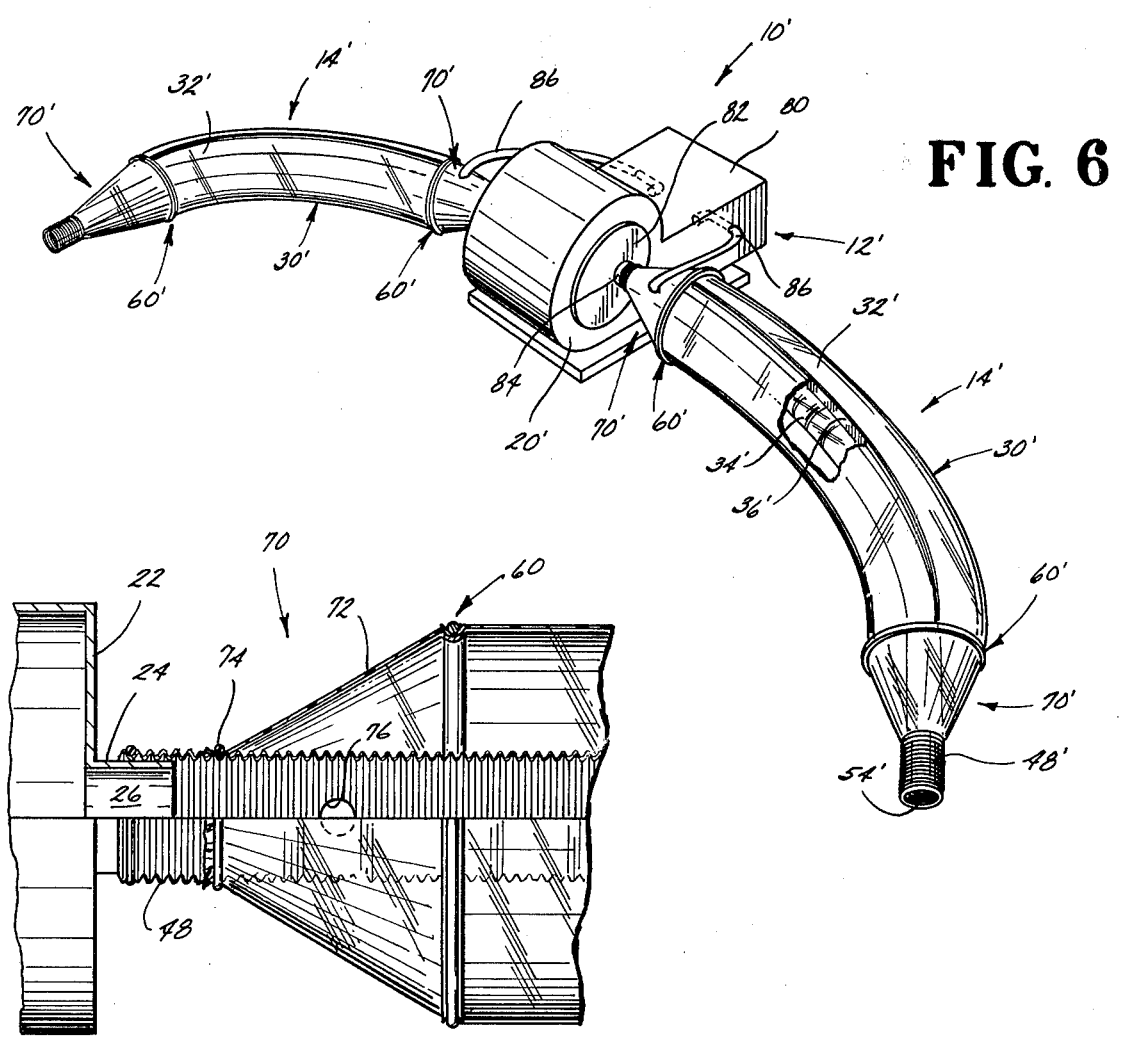
FIG. 6
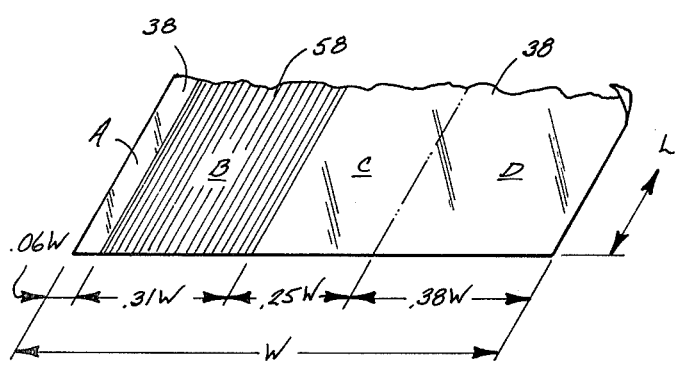
FIG. 5
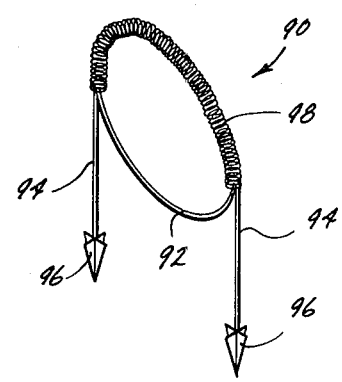
FIG. 8
FIG. 7

SOLAR AIR HEATER

BACKGROUND OF THE INVENTION

The invention relates generally to solar energy collectors and more specifically to a solar energy collector of indeterminate length fabricated of flexible plastic materials for heating a flow of air.

The increasing cost of fossil and other expendable fuels has prompted extraordinary interest in the development and application of devices intended to recover solar energy. Embarking upon an examination of prior art solar collectors, one finds that it is convenient to divide the technology into two classifications: those utilizing a fluid for initial energy collection and those utilizing a gas. Solar energy collectors in the former group tend to be large, rigid, heavy and intended for permanent installation on roof tops and similar locations and are typically utilized to provide heat to permanent structures. Conversely, solar air heaters are more often lightweight, portable and utilized to provide supplemental heat to buildings or heat for such purposes as grain drying and the like. Due to the lack of relevance of fluid media solar collectors with regard to the instant device, only gaseous media fluid collectors will be discussed below.

U.S. Pat. No. 3,908,631 teaches an elongate collector having an air passageway which is insulated from the environment by a larger inflated chamber disposed directly thereabove. A pair of blowers provide air flow through both the primary air passageway and the insulating chamber and air exiting the chamber is mixed with air from the primary passageway. While the unit here described provides good heat recovery due to the layer of insulating air contained in the chamber, the structure itself incorporates many design features which result in an expensive and somewhat difficult to manufacture device.

U.S. Pat. No. 4,203,420 teaches a less complex solar energy collector which generally defines an elongate tube fabricated of plural layers of intimately contacting material having differing solar energy transmitting, insulating and absorbing characteristics. Since the layers of the solar collector tube are in contact, this configuration is obviously more compact than that described above. However, the assembly of material into this configuration is costly and furthermore the limited quantum of insulation affects the overall performance of this solar collector device.

U.S. Pat. Nos. 4,059,095 and 4,151,830 both disclose collectors of generally rectangular configuration wherein air or other heat recovery media flows through a serpentine path. At least one layer of plastic film or similar material confines at least one layer of static, insulating air over the serpentine collector path to provide improved energy retention in the collector and recovery by the flowing air. Here again, while both designs apparently provide good energy recovery performance, their construction entails numerous seams, seals, layers of material, and construction techniques which markedly increase the cost of the product.

U.S. Pat. No. 4,182,307 teaches another construction variation wherein an elongate structure having a serpentine flow path is disposed within a semi-circular insulating shroud. The serpentine collector is appropriately inclined to receive maximum energy from the sun. Again, the complexity of the device militates against its production at a price commensurate with its energy recovery capability. Furthermore, this solar collector is apparently several feet in height and therefore suggests that it not only may be adversely affected by wind but also may represent an overly attractive target for vandals.

From this review of the prior art, it can be seen that numerous devices, though available, each suffer from various shortcomings, most notably significant expense of materials and manufacture, especially when compared to their energy recovery capabilities and/or useful life.

SUMMARY OF THE INVENTION

The instant invention comprehends a solar air heater comprising a plurality of elongate, generally concentric cylinders. The outer or first cylinder and middle or second cylinder are interconnected by a suspension structure and cooperatively define an annular insulating region. Within the middle cylinder is disposed an inner cylinder defining a cylindrical flow region. The outer and middle cylinders as well as the suspension structure may be fabricated of a relatively thin polyethylene or vinyl sheet material whereas the inner cylinder is preferably constructed of somewhat thicker plastic material which is rendered self-supporting by the addition of a stiffening structure such as a helical wire such that it may withstand low negative pressures as well as positive pressures without collapsing or materially deforming. The outer cylinder may also include a portion, preferably approximately one-half its circumference which is white or silvered or aluminized in order to reflect solar energy toward the centrally disposed inner cylinder.

Construction of the device entails utilization of an indeterminate length of a thin, flexible plastic sheet material which may be folded upon itself and sealed to form the outer and middle cylinders as well as the suspension structure. As noted, the inner cylinder preferably is fabricated of more rigid material which inhibits collapse of the tube should air be drawn through the solar heater under negative pressure rather than forced through the heater under positive pressure as may be accomplished if desired. When utilized under positive pressure, a small bleed hole from the inner cylinder into the insulating annulus is utilized to inflate and maintain the insulating annulus in inflated condition. If utilized under negative pressure, a return line from the outlet of an associated blower into the insulating annulus provides the required flow of inflating air.

From the foregoing, it will be apparent that a solar energy collector according to the instant invention is readily manufactured of conventional materials and therefore is inexpensive and provides a high return on monies invented in a solar heater. The inner cylinder is preferably corrugated and thus may collapse to a small fraction of its length and since the outer and middle cylinders as well as the suspension structure are relatively lightweight, the heater may be collapsed so that it occupies a minimal volume when it is not installed and operating which facilitates shipment and storage thereof. Furthermore, simple, reusable splicing structures are utilized to permit ready assembly, disassembly and to facilitate increase in the energy collection capacity of the solar air heater simply by inserting additional collector sections.

Thus it is an object of the instant invention to provide a solar air heater of simple construction which is inexpensive to manufacture and provides excellent energy recovery.

It is a further object of the instant invention to provide a solar air heater having a design which is readily adaptable to compact storage and shipment.

It is a still further object of the instant invention to provide a solar air heater which may be readily assembled and installed, augmented to increase energy collection and disassembled and stored.

It is a still further object of the instant invention to provide a solar air heater which, when installed, is relatively compact and unobtrusive and therefore relatively immune to damage from strong winds and other sources.

It is a still further object of the instant invention to provide a solar air heater which may be utilized at both positive and negative pressures.

Further objects and advantages of the instant invention will become apparent by reference to the following description of the preferred embodiment and appended drawings.

BRIEF DESCRIPTION OF THE DRAWINGS

FIG. 1 is perspective view of the preferred embodiment of a solar air heater according to the instant invention;

FIG. 2 is a full, sectional view of a solar air heater according to the instant invention taken along line 2—2 of FIG. 1;

FIG. 3 is an enlarged, fragmentary sectional view of a solar air heater according to the instant invention taken along line 2—2 of FIG. 1;

FIG. 4 is a fragmentary sectional view of a solar air heater according to the instant invention taken along line 4—4 of FIG. 1;

FIG. 5 is a side elevational view in half section of a solar air heater according to the instant invention taken along line 5—5 of FIG. 1;

FIG. 6 is a perspective view of sheet material having a white or aluminzied region for a solar air heater according to the instant invention in preassembly configuration;

FIG. 7 is a perspective view of an alternate embodiment of the solar air heater according to the instant invention; and FIG. 8 is a perspective view of a hold-down for use with the solar air heater according to the instant invention.

DESCRIPTION OF THE PREFERRED EMBODIMENT

Referring now to FIGS. 1 and 5, a solar air heater assembly according to the instant invention is illustrated and generally designated by the reference numeral 10. The solar heater assembly 10 generally includes a blower assembly 12 for providing a flow of air and a collector assembly 14 to which air from the blower assembly 12 is supplied and heated. The blower assembly 12 includes a blower wheel 16 which may be of squirrel-cage construction of other wholly conventional design which is driven by a mechanically coupled prime mover such as an electric motor 18. The blower wheel 16 is rotatably disposed within a suitable housing 20 to which the motor 18 may be secured. The blower assembly 12 preferably includes suitable protective grillwork (not illustrated) over the inlet to the blower wheel 16 and protective guards (not illustrated) over the mechanical coupling between the motor 18 and blower wheel 16 as those skilled in the art will readily understand. A baffle plate 22 is secured across the outlet of the housing 20 and includes a circular collar 24 which defines an outlet opening 26 through which air under low static pressure exits the blower assembly 12.

Referring now to FIGS. 1, 2, and 3, the solar collector assembly 14 includes at least one and typically a plurality of elongate collector sections 30. The collector sections 30 may define any convenient flow path such as axial and U-shaped as illustrated in FIG. 1, semi-circular, or serpentine. It should be appreciated that such a choice is merely a matter of convenience and expedience depending upon the desired locations of the inlet and blower assembly 12 and outlet. Each collector section 30 of the solar collector assembly 14 includes an outer wall 32, a middle wall 34, and a hanger 36 which are all fabricated from a single panel 38 of plastic material of indeterminate length as illustrated in FIG. 7. The plastic panel 38 is preferably vinyl but may be any similar material having suitable characteristics of flexibility and transparency to solar energy. The panel 38 is folded to define the outer wall 32, the middle wall 34, and the hanger 36 as illustrated in FIGS. 2 and 3 and a four layer seam 40 is effected axially along the length of each section 30 by application of radio frequency or heat energy in accordance with conventional plastic sealing techniques. So configured, the panel 38 and the walls 32 and 34 define an outer, annular chamber 42 and a middle, generally circular chamber 44.

An axially extending collector tube 48 is received within the middle chamber 44 defined by the middle wall 34 and is slightly longer than the walls 32 and 34 of the collector section 30 with which it is associated. The collector tube 48 is suspended concentrically within the outer wall 32 by the hanger 36. The collector tube 48 is also preferably fabricated of vinyl or similar material but includes dispersed carbon black or a similar substance which renders the tube 48 highly absorbent of solar energy. In order to maintain the collector tube 48 in the desired circular configuration under all operating conditions, the wall of the collector tube 48 is corrugated as illustrated in FIGS. 4 and 5 and includes a helically wound strand of reinforcing wire 52 embedded therein. The collector tube 48 defines a flow region or passageway 54 which extends without interruption along the full axial length of the collector section 30.

Inasmuch as an approximately three inch layer of insulating air within the outer chamber 42 has been found to be a preferable compromise between excessive diameter of the collector assembly 14 and excessive heat loss, this three inch radial thickness of the outer chamber 42 is maintained throughout various designs having differing total diameters. Thus, the diameter of the outer wall 32 is approximately six inches greater than the diameter of the middle wall 34 and the collector tube 48. By way of further example, with an outside diameter of the outer wall 32 of fourteen inches, the mean diameter of the middle wall 34 and the collector tube 48 is preferably eight inches. With an outside diameter of the outer wall 32 of twenty inches, the mean diameter of the middle wall 34 and the collector tube 48 is again, approximately six inches smaller than the given diameter or fourteen inches.

The collector tube 48 preferably has a wall thickness of approximately 0.010 inches when the mean diameter of the collector tube 48 is in the range of from four inches to eight inches and has a thickness of approximately 0.016 inches if the collector tube 48 has a mean diameter of approximately twelve to fourteen inches. Clearly, these thicknesses may be varied somewhat from less than about 0.0075 inches to about 0.020 inches depending upon various characteristics of the collector assembly 14 and the material from which the tube 48 is fabricated. In order to provide sufficient rigidity, the diameter of the wire 52 is preferably in the range of from about 0.025 inches to about 0.035 inches. The wire 52 is preferably fabricated of carbon steel and has properties similar to piano wire or other relatively stiff wire.

Referring now to FIGS. 2 and 7, the plastic panel 38 which is folded and sealed to form the outer wall 32, middle wall 34, and hanger 36, is, in preassembly configuration, merely a panel 38 of sheet plastic material having a width slightly over five times the diameter of the completed collector assembly 14 and a length as determined by the required length of the section 30 to be assembled and thickness in the range of from about 3 to 8 mils. As noted previously, the plastic material is preferably vinyl having suitable flexibility and solar transparency. For increased solar collection efficiency, a portion of the outer wall 34 may be fabricated of a reflecting material such as white or aluminized vinyl. Aluminized vinyl reflects the sun's rays which have passed through the outer chamber 42 without striking the collector tube 48 and reflects them generally back toward the collector tube 48. An aluminized collector assembly 14 is fabricated by removing a panel equal to approximately 0.31 times the total width W of the plastic panel 38 and inserting and sealing with appropriate overlapping seams a panel 58 of an appropriate aluminized plastic material. For example, a solar collector section 30 having an outer wall 32 of diameter ten inches will require a plastic panel 38 having a total width W of approximately fifty-two inches. Of this fifty-two inches, approximately thirty-two inches will encompass that region of the outer wall 32, the areas designated by A, B and C in FIG. 7 and occupying approximately 0.06 W, 0.31 W, and 0.25 W, respectively. The remaining twenty inches defined generally by the region D and occupying approximately 0.038 W constitutes the hanger 36 and middle wall 34. Where W equals fifty-two inches, the width of the aluminized panel 58 will be approximately sixteen inches, fifty percent or 180° of the outer wall 32. It should be understood that the circumference or percentage of the aluminized panel 58 may be varied in response to various intended purposes of the collector assembly 14.

Referring now to FIGS. 1 and 4, a splice assembly 60 which facilitates interconnection of individual collector sections 30 of the collector assembly 14 is illustrated. The splice assembly 60 includes a cylindrical sleeve 62 having an outside diameter slightly larger than the inside diameter of the collector tube 48 which is inserted approximately half-way way into each open, adjacent end of the collector tubes 48 of aligned ends of sections 30 of a collector assembly 14. A pair of straps 64 such as cable ties or endless tension springs seat within the corrugations of the collector tubes 48 and secure the adjacent ends of the collector tubes 48 to the cylindrical sleeve 62. A similar splicing mechanism is utilized to interconnect the two adjacent ends of the outer wall 32. Here, a hoop or annulus 66 is received within the innermost one of a pair of outer walls 32 of the aligned ends of adjacent collector sections 30. The axis of the annulus 66 is disposed parallel to the axis of the collector sections 30. In FIG. 4, the inner one of the pair of outer walls 32 is illustrated on the right of the drawing. The other of the outer walls 32, generally illustrated on the left of the drawing, extends over the annulus 66 and inner one of the outer walls 32 from the opposite direction. A strap 68 such as a cable tie or similarly selectively securable device extends about the periphery of the annulus 66 to maintain the outer walls 32 in a secure, overlapped and sealed configuration as illustrated. The annulus 66 may be fabricated of any suitable material such as metal or plastic. It should be apparent that this splice assembly 60 is readily applied to the collector sections 30 and collector tubes 48, equally as readily removed, provides an airtight seal to the components of the collector assembly 14 and is reusable.

Referring now to FIGS. 1 and 5, a terminal assembly 70 of the collector assemblies 14 are illustrated. Each of the terminal assemblies 70 generally defines a frusto-conical plastic cap 72. The larger diameter end of the frusto-conical cap 72 is received within a splice assembly 60 described directly above. The smaller diameter end of the frusto-conical cap 72 tapers to a diameter substantially equal to the outside diameter of the collector tube 48 and includes a circular strap 74 such as a cable tie or endless tension spring which gathers and secures the end of the cap 72 to the collector tube 48 in an airtight manner. A similar strap 74 is utilized to secure the end of the collector tube 48 about the circular collar 24 of the blower assembly 12. Proximate the terminus of the collector tube 48 and disposed in its wall generally within that region defined by the plastic cap 72 is disposed an aperture 76. The aperture 76 provides communication between the passageway 54 defined by the collector tube 48 and the outer annular chamber 42 such that the outer walls 32 of the collector sections 30 are inflated when the blower assembly 12 is activated and air moves through the collector assembly 14. The diameter of the aperture 76 is preferably about 1 inch but the diameter may be varied between about 0.75 inches and 1.25 inches depending upon the total size of the collector assembly 14 and the desired speed of inflation.

With reference now to FIG. 6, an alternate embodiment of the solar air heater assembly 10' is illustrated. The alternate embodiment solar air heater 10' is substantially similar to the preferred embodiment assembly 10 with the exception that it includes a pair of collector assemblies 14' and that air is drawn through the collector assemblies 14' under negative pressure rather than being forced therethrough under positive pressure. Certain modifications to the equipment are therefore necessary. First of all, the housing 20' of the blower assembly 12' does not include the baffle 22 of the preferred embodiment but rather defines merely an open outlet 80 which is connected to the equipment or devices utilizing the air heated by the solar air heater 10'. The inlets of the blower assembly 12' are covered by circular baffle plates 82 having circular collars 84 which received terminal portions of the collector tubes 48' in a secure manner.

Likewise, the collector assemblies 14' of the alternate embodiment are similar though not identical to the collector assemblies 14 of the preferred embodiment. The collector sections 30' include the outer wall 32' the middle wall 34' and the hanger 36'. Likewise, a collector tube 48' extends from the blower assembly 12 along the full length of each collector assembly 14'. Adjacent the terminal portion of each of the collector tubes 48' is disposed a terminal assembly 70' which is similiar to the terminal assembly 70 of the preferred embodiment. The terminal assembly 70' is secured by suitable components of a splice assembly 60' which is identical to the splice assembly 60 illustrated in FIG. 4.

The significant difference between the alternate and preferred embodiments relates to the structure and method whereby the outer annular chamber 42' is inflated. Inasmuch as air passing through the passageway 54' is under negative pressure, it cannot be utilized to inflate the outer chamber 42'. Thus, air must be tapped from the exhaust of the blower assembly 12' and supplied to the chambers 42'. Such a supply of air under low positive pressure is provided by the tubes 86 which communicate between the outlet of the blower assembly 12' in the region of the outlet duct 80 and the chamber 42' in the region of the terminal assembly 70' adjacent the blower assembly 12'. It should also be noted that whereas the alternate embodiment assembly 10' may conveniently be utilized with a pair of collector assemblies 14', this is by no means necessary. Similarly, although the preferred embodiment assembly 10 has been illustrated with but a single flow path, parallel flow paths through parallel collector assemblies 14 may likewise be utilized.

Referring now to FIG. 8, a spring hold-down for use with either of the collector assemblies 14 or 14' is illustrated. A spring hold-down assembly 90 includes a relatively rigid preformed semi-circle 92 having a diameter equal to the diameter of the collector assembly and parallel tangentially disposed legs 94 having terminal spikes or similar structures 96 which retain the assembly 90 in soil or other displacable medium. Interconnecting the upper portions of the legs 94 is a selectively releasable tension spring 98. The assembly 90 may be disposed at any convenient location along the length of the collector assemblies and including coincident with one of the splice assemblies 60. The tension spring 98 is secured over the outer wall 32 of the collector section 30, thereby securing the collector assembly 14 against unwanted motion caused by wind or other external forces.

It will be appreciated that installation and operation of either the preferred or alternate embodiment of the solar air heater assembly 10 or 10' is both rapid and straightforward. The assemblies 10 or 10' may be assembled and installed as illustrated in FIGS. 1, 4, 5 and 6. That is, either one or more of the collector assemblies 14 may be utilized with either the positive pressure design of the preferred embodiment or the negative pressure design of the alternate embodiment. Similarly, the collector assemblies 14 may be oriented in parallel, serpentine, U-shaped or any other configuration which provides convenient locations of the inlets and outlets of the collector assemblies 14 or 14'. Subsequent to the application of power to the electric motor 18 or other prime mover, a flow of air will be established through the passageway 54 or 54' which will be heated by the available solar energy. The quantity of air through the collector assembly or assemblies 14 and 14' may be throttled by dampers or other suitable means (not illustrated) or the speed of the blower assembly 12 may be increased or decreased in order to control the temperature of the air delivered by the collector assembly 10 as those familiar with solar collectors will readily appreciate.

The foregoing disclosure is the best mode devised by the inventors for practicing this invention. It is apparent, however, the devices incorporating modifications and variations will be obvious to one skilled in the art of solar collector devices. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A solar energy collecting assembly comprising, in combination, at least one elongate, generally cylindrical collection section having two ends, said collector section having a first, outer layer of a flexible plastic material, a second, middle layer of a flexible plastic material secured along an axially extending seam to said outer layer, said middle layer generally defining a cylindrical receiving hanger and cooperatively defining with said outer layer an annular insulating region, a third, inner layer defining a substantially self-supporting elongate hollow cylinder disposed within said middle layer suitable for receiving flow of air, aperture means disposed in said inner layer for providing communication between the interior of said third layer and said annular insulating region and seal means disposed adjacent each end of said collecting assembly for closing off said annular insulating region whereby air entering said region through said aperture means is generally confined therein.

2. The solar energy collecting assembly of claim 1 further including means for providing a flow of air through said self-supporting elongate cylinder.

3. The solar energy collecting assembly of claim 1 wherein said third inner layer is plastic and includes a helically wound wire.

4. The solar energy collecting assembly of claim 1 further including a splice means for coupling a pair of collector sections, said splice means including a cylindrical sleeve disposed within said inner layer, and an annulus disposed within overlapped ends of said outer layers and means for securing said overlapped ends to said annulus.

5. The solar energy collecting assembly of claim 1 further including an aluminized material disposed about a portion of the circumference of said outer layer.

6. The solar energy collecting assembly of claim 1 wherein said first layer and said second layer are formed from a unitary panel.

7. The solar energy collecting assembly of claim 1 wherein said axially extending seam is disposed generally along the upper portion of said collector assembly.

8. The solar energy collecting assembly of claim 1 wherein said cylinder receiving layer defines a web extending generally radially inwardly from said axially extending seam.

9. The solar air heater comprising, in combination, air moving means for providing a flow of air, and an elongated collector assembly having first and second ends and including a first, outer layer of a plastic material, a second, middle layer of plastic material secured to said first layer along an axially extending seam, said middle layer defining a passageway and cooperatively defining a generally annular passageway with said outer layer, a third, inner layer defining a substantially self-supporting elongated hollow cylinder disposed in sand passageway and defining a flow passageway for receiving such flow of air from said air moving means, aperture means disposed in said inner layer for providing communication between the interior of said third layer and said annular passageway and seal means disposed generally proximate said ends for sealing said outer layer to said inner layer whereby air entering said annular passageway through said aperture means is generally confined therein.

10. The solar air heater of claim 9 wherein said third inner layer includes means for maintaining it in a generally circular cross section.

11. The solar air heater of claim 9 wherein a portion of said first outer layer is a reflecting material.

12. The solar air heater of claim 9 wherein the thickness of said outer layer and of said inner layer is between about 3 to 8 mils.

13. The solar air heater of claim 9 wherein the thickness of said inner layer is between about 0.010 inches and 0.016 inches.

14. The solar air heater of claim 9 wherein said first layer and said second layer are formed from a unitary panel.

15. The solar air heater of claim 9 wherein said axially extending seam is disposed generally along the upper portion of said collector assembly.

16. The solar air heater of claim 9 wherein said cylinder receiving layer defines a web extending generally radially inwardly from said axially extending seam.

* * * * *